UNITED STATES PATENT OFFICE.

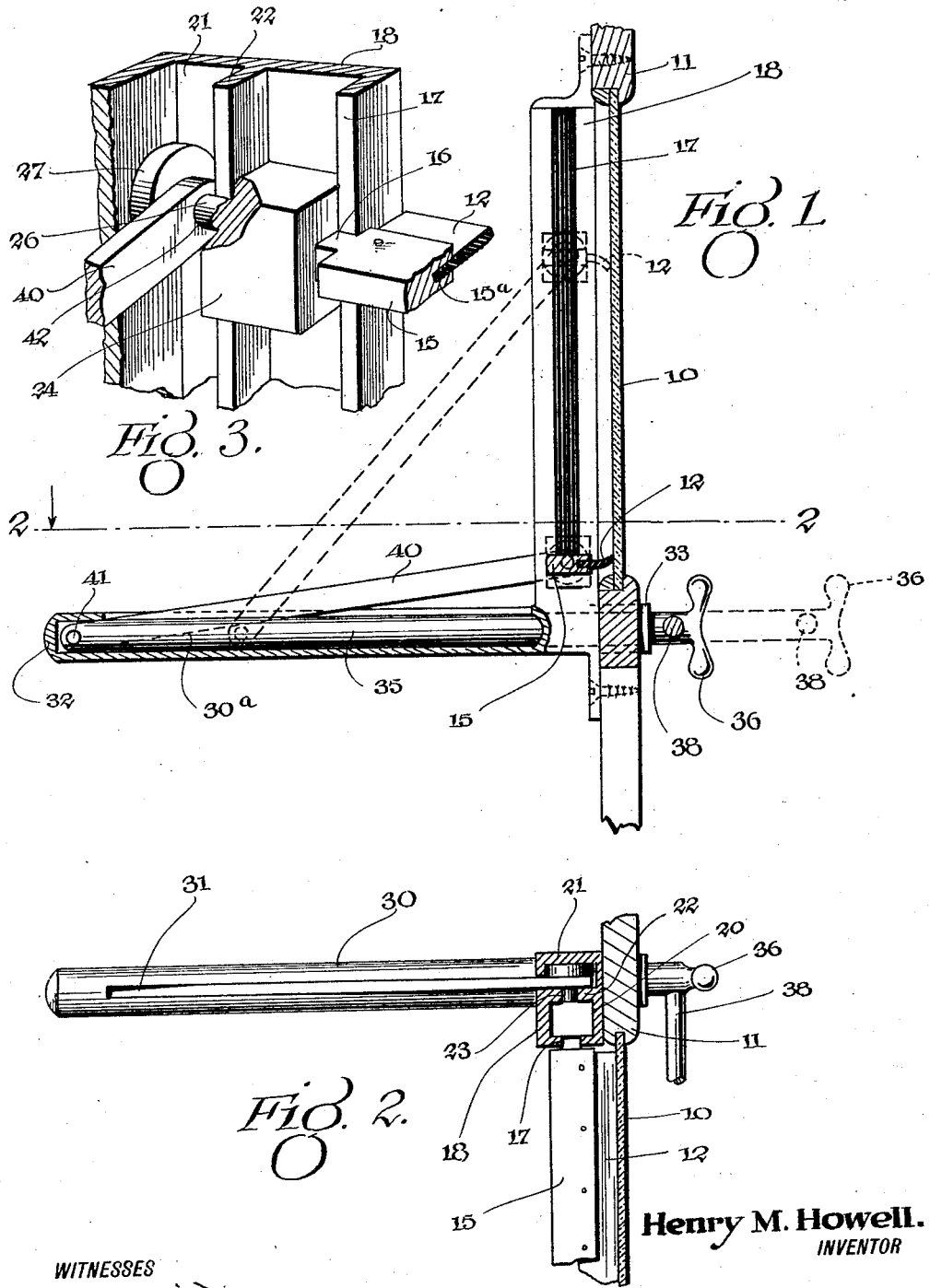

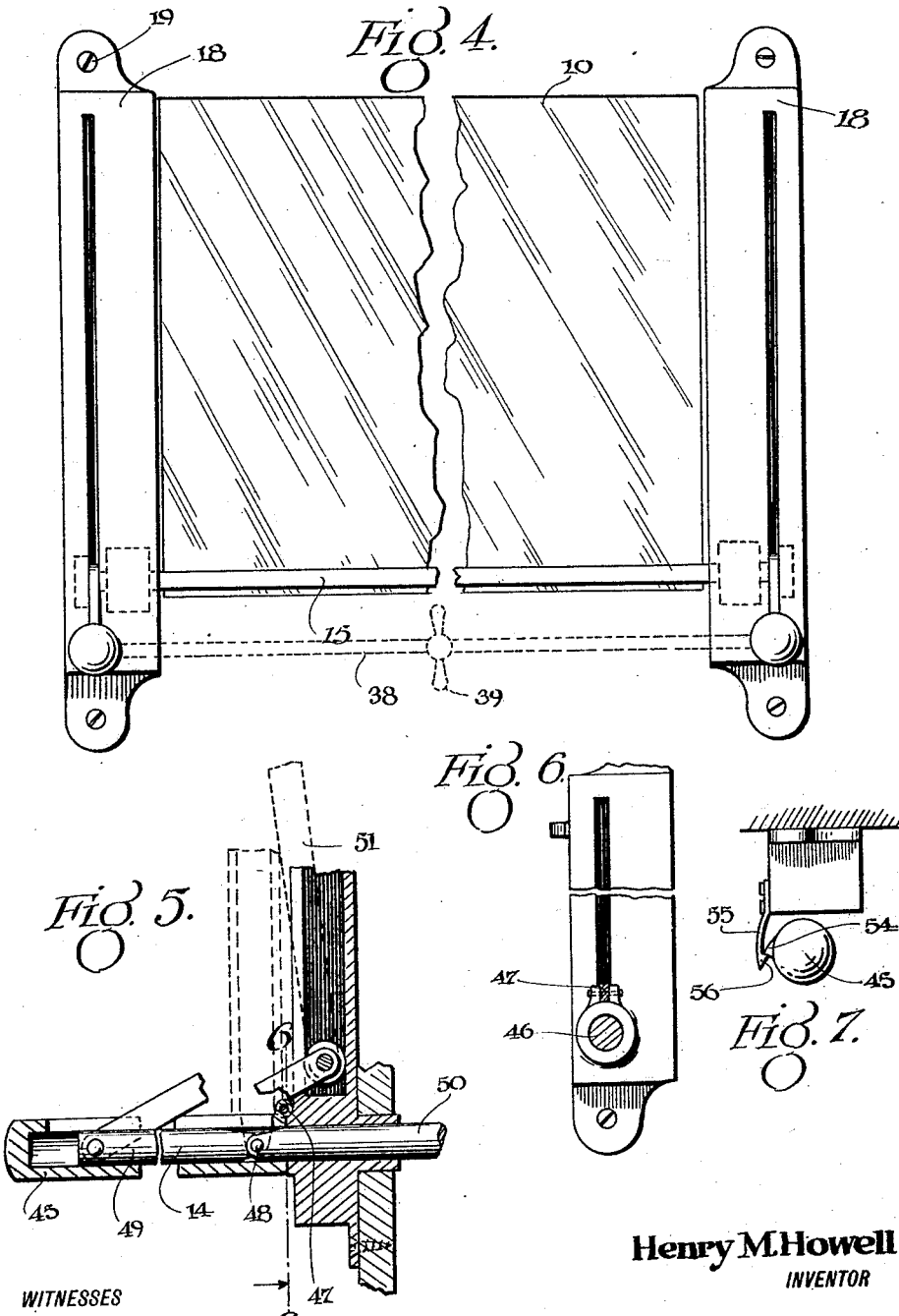

HENRY M. HOWELL, OF MONROE, LOUISIANA, ASSIGNOR OF FIFTY PER CENT TO JOHN E. DOUGHTIE, OF MONROE, LOUISIANA.

WINDOW CLEANER OR WIPER.

1,408,945.   Specification of Letters Patent.   Patented Mar. 7, 1922.

Application filed April 4, 1921. Serial No. 458,190.

*To all whom it may concern:*

Be it known that I, HENRY M. HOWELL, a citizen of the United States, and a resident of Monroe, in the county of Ouachita and State of Louisiana, have invented certain new and useful Improvements in Window Cleaners or Wipers, of which the following is a specification.

The present invention relates to window cleaners or wipers, and has for its object to provide a device of this character which is adapted to thoroughly and completely wipe or clean the glass of a window, wind-shield, locomotive-cab or the like, which may be readily operated and requires for its operation the exercise of a minimum degree of effort and of attention on part of the operator, and which is of simple and durable construction, reliable in operation, attractive in appearance and easy and inexpensive to manufacture and install.

Other objects and advantages of the invention reside in certain novel features of construction, combination and arrangement of parts which will be hereinafter more fully described and particularly pointed out in the appended claims, reference being had to the accompanying drawings forming part of this specification, and in which:

Figure 1 is a view in longitudinal vertical section of the invention organized with the window;

Figure 2 is a horizontal sectional view on line 2—2 of Figure 1;

Figure 3 is a fragmentary perspective view of the bearing and adjacent instrumentalities of the wiper carrier;

Figure 4 is a fragmentary view in front elevation;

Figure 5 is a fragmentary sectional view of a slightly modified form of the invention;

Figure 6 is a sectional view on line 6—6 of Figure 5;

Figure 7 is a detail view in elevation, illustrating the locking mechanism employed in conjunction with the modified form.

Referring to the drawings wherein for the sake of illustration is shown the preferred embodiment of the invention, and especially to Figures 1 to 4, the numeral 10 designates the window which consists of a pane of glass, or other suitable transparent material and which is mounted in any suitable manner in the frame 11. A cleaning element or wiper 12 is provided and preferably consists of a strip of rubber or other material which extends entirely across the pane of glass and which is adapted to traverse the pane by partaking of a bodily reciprocatory motion thereacross. The carrier 15 supports the wiper and carries it through its movements and consists of a bar having a longitudinal groove 15ᵃ in which the wiper is received and secured. At its end the carrier is reduced to provide arms 16 which extend through suitable slots 17 provided in bearings designated generally at 18. These bearings 18 are arranged along each side of the window and are suitably supported upon the frame of the window by fastening means such as screws 19 or the like. They are identical in construction and each includes an elongated guide 20 and an enclosed track 21 which runs parallel with the guide for its entire length. The track and the guide are separated from each other by means of a partition 22 having an opening 23 therein for its entire length to establish communication between the guide and the track.

A guide block 24 is slidably received in the guide 20 and is connected with the arm 16 of the carrier. Adjacent the groove 23 a trunnion 26 extends from the guide block 24 through the groove and across the track 21. A roller 27 is mounted on the trunnion and is operatively arranged on the track.

Means is provided for imparting motion to said carrier to cause the wiper to traverse the glass and including a barrel 30 extending outwardly from the lower end of each of the bearings 18 and having a slot 31 extending longitudinally of the upper portion thereof. The outer end of each barrel is closed, as at 32, and the inner end of the barrel extends through the bearing and through the frame 11 and is open at its inner end as at 33. A plunger 35 is mounted for reciprocatory movement in said barrel and is provided at its outer end with a handle or hand grip 36 whereby it may be manually operated. The plungers are connected by means of a transverse bar 38 having a knob or other suitable hand grip provided centrally thereof. The bar 38 and the hand grip 39 may be utilized by the operator in lieu of the handles 36 whenever it is desired to do so.

Motion transmission means is provided for transmitting the motion of the plunger 35 to the carrier and preferably consists of the link 40 pivotally connected, as at 41 to the plunger and pivotally connected as at 42 to the trunnion 26. As most clearly indicated in Figure 1, as the plunger 35 is reciprocated the end of the link pivotally connected to the trunnion 26 will be constrained to move upwardly and downwardly and the guide block 24 and the roller 27 highly adapt the organization to partake of this movement as the guide block is freely slidable in its guide and the roller 27 is readily movable on its track. The link 40 in partaking of its movement operates through the slot of the barrel and in order to accommodate the link in its lowermost movement, the plunger is provided with a tapered slot, as indicated in dotted lines at 30$^a$ in Figure 1.

In the modified form shown in Figures 5, 6 and 7 the wiper is constructed precisely as in the embodiment above described except that the barrel and the plunger here designated at 45 and 46 and referred to in the other embodiment as 30 and 35 are made collapsible so that they may be disposed in snug nested relation when not in use. For this purpose the barrel is hinged as at 47 and the plunger is hinged, as at 48, to provide two sections designated at 49 and 50. In order to collapse the device, the barrel is swung upwardly and carries with it the section 46. The link here designated at 51 is disposed in between the barrel and its bearing. Locking mechanism is provided for retaining the barrel in collapsed position and includes a lock lug 54 carried by the barrel 45 and cooperable with the spring latch member 55 carried by the bearing and having a head 56 engageable with the lock lug.

I claim:

1. In a device of the character described, a wiper, a reciprocable carrier for said wiper, bearings for said carrier and including a track and a guide, a roller on said carrier operating on said track, a guide block on said carrier operating in said guide, means for imparting motion to said carrier including a barrel having a slot, a reciprocable plunger in said barrel, and a link operating through said slot and connecting said plunger and said carrier, and operating mechanism including a knob connected with said plunger.

2. In a device of the character described, a wiper, a reciprocable carrier for said wiper, bearings for said carrier and including a track and a guide, a roller on said carrier operating on said track, a guide block on said carrier operating in said guide, and means for imparting motion to said carrier including a barrel having a slot, a reciprocable plunger in said barrel and a link operating through said slot and connecting said plunger and said carrier.

3. In a device of the character described, a wiper, a carrier for said wiper, bearings for said carrier, means for imparting motion to said carrier including a pivoted barrel and a plunger in said barrel consisting of pivoted sections, a link connecting said plunger and said carrier, and operating means for said plunger.

4. In a device of the character described, a wiper, spaced bearings for said wiper, a carrier for said wiper journaled for reciprocatory movement in said bearings, means for imparting motion to said carrier including a barrel adjacent each of said bearings, a plunger in each of said barrels, motion transmission means between each plunger and said carrier, and a transverse rod connecting said plungers.

5. In a device of the character described, a wiper, a carrier for said wiper, bearings for said carrier, means for imparting motion to said carrier including a barrel and a plunger in said barrel, a link connecting said plunger and carrier, and operating means for said plunger.

HENRY M. HOWELL.